United States Patent [19]

Uhlig

[11] 4,132,146

[45] Jan. 2, 1979

[54] SWIVEL NUT ASSEMBLY

[75] Inventor: Raimer Uhlig, Munich, Germany

[73] Assignee: Hilti Aktiengesellschaft, Schaan, Liechtenstein

[21] Appl. No.: 805,172

[22] Filed: Jun. 9, 1977

[30] Foreign Application Priority Data

Jun. 25, 1976 [DE] Fed. Rep. of Germany ....... 2628508

[51] Int. Cl.² ............................................. F16B 37/08
[52] U.S. Cl. ......................................................... 85/33
[58] Field of Search .................... 85/33, 51; 151/19 R; 10/86 R

[56] References Cited

U.S. PATENT DOCUMENTS

| 663,208 | 12/1900 | Wrensch | 85/33 |
| 1,450,014 | 3/1923 | Berglof | 85/51 |
| 1,777,614 | 10/1930 | Hauger | 85/51 |
| 2,976,012 | 3/1961 | Allen | 85/33X |

FOREIGN PATENT DOCUMENTS 1206230  8/1959  France .......................................... 85/33

*Primary Examiner*—Ramon S. Britts
*Attorney, Agent, or Firm*—Toren, McGeady and Stanger

[57] ABSTRACT

A swivel nut assembly consists of a nut formed of a pair of pivotally interconnected U-shaped disks each forming a U-shaped recess. The disks can be pivoted from an open position with the U-shaped recesses disposed in spaced relation to a closed position where the disks overlap and a portion of each of the recesses combine to provide the threaded opening through the nut. Each disk has an extension projecting from it toward the other disk. In the closed position the disks can be locked together.

8 Claims, 3 Drawing Figures

SWIVEL NUT ASSEMBLY

SUMMARY OF THE INVENTION

The present invention is directed to a swivel nut assembly consisting of two U-shaped disks which are pivotally interconnected about an axis extending parallel and eccentric to the axis of the threaded opening through the nut. The U-shaped disks can be pivoted relative to one another between an open position and a closed position with the disks in overlapping relation. Each disk forms a U-shaped recess and the base of the recess has at least one screw thread formed in it so that in the closed position the screw threads in the recess form the threaded opening through the nut.

Nuts are known which are used as stops for various objects on long threaded rods and positioning the nuts can take a considerable amount of time depending on the length of the rods. Further, frequently the threads on the ends of the rods are damaged with the result that a nut cannot be readily screwed onto the rod without reworking its threads.

To overcome such a problem and also for use on rods where the thread does not extend to the end of the rod or where the end of the rod is provided with a collar, multi-part nuts have been known which can be fitted onto the rod by joining individual parts after they have been positioned radially inwardly about the rod.

In one arrangement, such multi-part nuts have been divided in the axial direction with the individual parts having projections and corresponding recesses. By fitting the projection into the recesses, the individual parts can be joined together. A disadvantage of this type of nut is the multi-part construction, which requires cumbersome assembly work, and often results in the loss of individual parts.

Another multi-part nut is known as a swivel nut and consists of two symmetrical disks connected to one another at a joint. By moving the disks toward one another, a threaded rod can be embraced. Such a swivel nut has certain advantages, however, there are also considerably disadvantages in terms of loading capacity, particularly in the assembly of the nut parts. The swivel nuts can only be loaded on one side and, therefore, require great care in assembly. Beyond the fact that the individual disks of such a swivel nut must be held together with clamps or the like, it is important that these disks do not move apart when a tool is applied to the nut, for example, in the form of a fork wrench, with the result that the desired function of the nut is lost. The forces acting independently on the individual disks when a tool is applied to the swivel nut, must be absorbed completely by the retaining clamps and, therefore, the claims must be made correspondingly strong. Frequently these clamps must be applied in the axial direction of the rod and such an operation leads to additional inconveniences in the assembly of the nut.

Accordingly, it is the primary object of the present invention to provide a swivel nut assembly which can be easily positioned on a threaded bar without using special tools, which has an optimum load distribution, and also has a maximum thread length relative to the height or axial dimension of the nut.

Therefore, the present invention affords a swivel nut assembly consisting of interconnected disks which can be moved from an open position to a closed position where the disks overlap and form the nut. Each of the disks has a flat side facing the other disk with an extension projecting from that flat side which is disposed into contacting engagement with the other disk when they are disposed in overlapping relation so that a full annular disk is provided with a central threaded opening. The separation plane between the individual disks extends normal to the axis of the swivel nut with the result that a tool acting on the outside periphery of the nut, such as a fork wrench, acts uniformly on both disks. With such a swivel nut, the load distribution is equal. By providing the extension on one disk in engagement within the recess formed by the other disks when they are in overlapping relation, the openings formed in the disks provide a laterally closed opening and the stop arrangement afforded by the extensions have the effect that the full axial dimension of the swivel nut is available for enclosing a threaded rod.

The side of the extension which extends from the surface of the disk forming the base of its U-shaped recess, preferably has one or more screw threads which correspond to the threads formed in the base of the recess. In this way the threaded surface within the U-shaped recess in each of the disks complements the other over the axial dimension of the nut so that a thread for engagement with a threaded rod is provided, after the disks are placed in overlapping relation in the closed position, with the axial length of the threads corresponding to the axial dimension of the swivel nut.

Another advantage of the swivel nut assembly according to the present invention is that the two disks which form the nut can be substantially symmetrical. A certain difference in the shape of the two disks is possible, however, by varying the shape of the portions which form the hinge connection, since these portions can have any form. Since one of the disks is superposed on the other after they have been assembled into the closed position, the hinge connection between them can be accomplished in a very simple manner, for example, by a bolt, pin or the like extending through a bore in one leg of each of the U-shaped disks. In another embodiment, the connection between the disks can be provided by molding a pin extending outwardly from the leg of one disk so that it can fit into a bore or a suitable recess in the corresponding leg of the other disk. This particular embodiment is preferable when the individual parts are produced by casting.

To prevent the individual disks from being accidentally displaced from the closed position, another feature of the invention is means for locking the disks together in the closed or overlapped position. Preferably, the locking means are formed on the extension of one of these disks and on a leg of the other disk so that the two parts of the locking means interengage when the disks are moved into the closed position. In a preferred arrangement, the locking means consist of a sawtoothed-shaped projection and a complementary-shaped recess. In such an arrangement, a simple assembly aid is afforded whereby, when the disks are moved into the overlapping or closed position, the locking means provide an audible and sensibly perceptible interconnection when the resistance caused by the natural resilience of the locking members is overcome. The force for disengaging the locking means is selected so that it can be effected without tools, so that manual assembly and disassembly is possible. The load distribution of the swivel nut assembly suggested in accordance with the present invention, improves with the increased circumference of the threaded rods. With increased circumference the ability to pivot the disks one relative to the other is also increased. To ensure a smooth movement of the disks into the closed position over a relatively long swivel path, the inner surface of the leg of the disk opposite the leg containing the pivotal connection, is preferably concave and has a radius of curvature coincident with the dimension from the axis of rotation to the inner surface.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
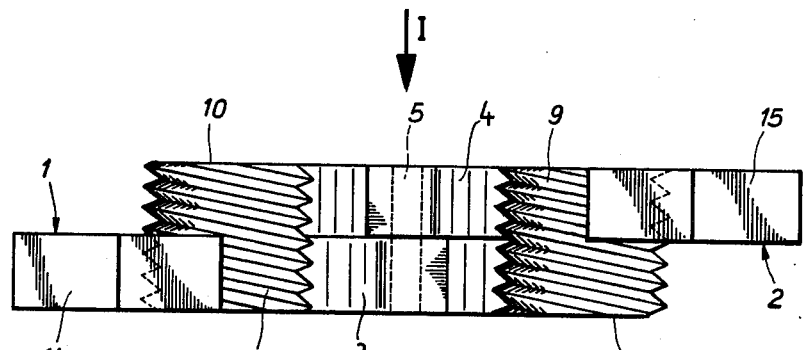
FIG. 2 is a view of the open swivel nut assembly shown in FIG. 1 taken in the direction of the arrow II in FIG. 1.
Figure 1:
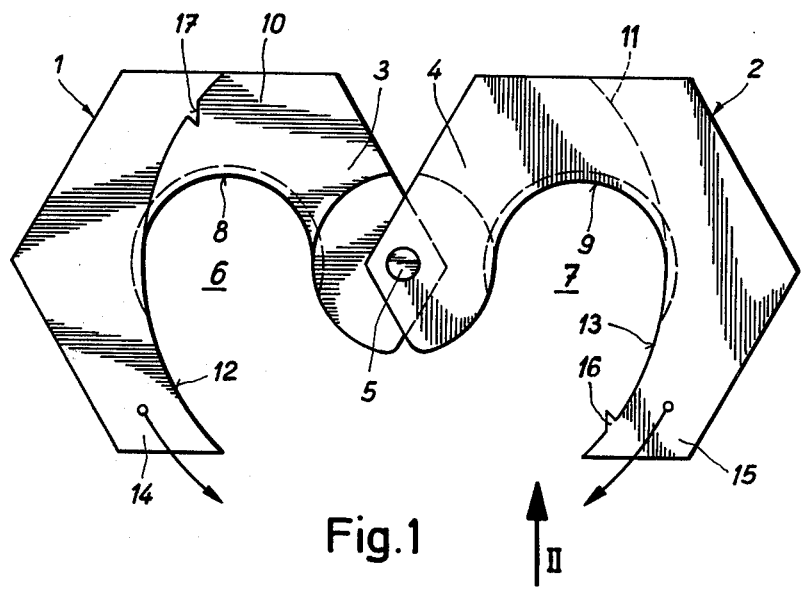
FIG. 1 is a plan view of a swivel nut assembly embodying the present invention, with the assembly in an opened position, the view being taken in the direction of the arrow I as shown in FIG. 2.
Figure 3:
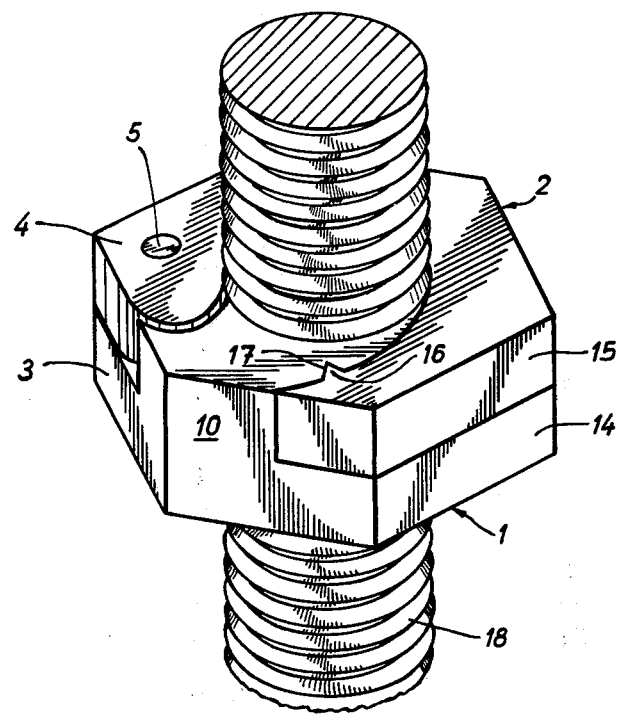
FIG. 3 is a perspective view of the swivel nut assembly of FIGS. 1 and 2 shown in the closed position mounted on a threaded rod.

As can be seen in FIGS. 1 to 3, the swivel nut assembly embodying the present invention includes two U-shaped disks 1,2. Each disk has a first leg 3,4 through which a bolt 5 extends providing a hinge connection between the two disks 1,2. As shown best in FIG. 1, each of the disks 1,2 has a U-shaped recess 6,7 with the base of the recess containing a thread 8,9. Extending outwardly from each of the disks 1,2 toward the other disk, is an extension 10,11, note FIG. 2. The combined height of each disk and its extension, that is, in the axial direction of the opening through the swivel nut assembly, corresponds to the axial length of the assembly.

Each of the disks 1,2 has a second leg 14,15 forming the opposite side of the U-shaped recess 6,7 from the first leg 3,4. As mentioned above, it is the base portion of the recess interconnecting the first and second legs, which has the threads 8,9. The inner wall 12,13 of the legs 14,15, that is, the surface of the legs which define a portion of the U-shaped recess 6,7, has a concave curvature. The radius of curvature of the walls 12,13 corresponds to the dimension from the axis of the pin 5 to the surface. In other words, the surfaces 12,13 each have a radius corresponding to the radius of the circle through whcih they rotate as the disks move between the open position shown in FIG. 1 and the closed position shown in FIG. 3. Formed on the inner wall 13 of second leg 15 of the disk 2 is a sawtoothed-shaped locking member or projection 16 which is arranged to lock into the complementary-shaped recess 17 formed in the surface of the extension 10 extending outwardly from the disk 1.

In FIG. 3, the opened swivel nut assembly shown in FIGS. 1 and 2 is closed around the threaded rod 18 with the second legs 14,15 disposed in an overlapping arrangement. The retention of the overlapping disks 1,2 in the closed position is afforded by the locking member 16 and the complementary recess 17. As can be seen in FIG. 3, a major portion of the circumferential contour of the swivel nut is formed by each of the disks 1,2 so that forces are transmitted uniformly to each of the disks by the action of a tool fitted onto the nut.

The hexagonal outer shape of the swivel nut assembly illustrated in FIGS. 1, 2 and 3 is provided only by way of example, it would be possible to provide the outer periphery of the nut with a cylindrical, square, octagonal or other suitable shape.

While specific embodiments of the invention have been shown and described in detail to illustrate the application of the inventive principles, it will be understood that the invention may be embodied otherwise without departing from such principles.

What is claimed is:

1. A swivel nut assembly comprises a nut having a pair of opposite sides with a threaded opening extending between and transversely of said opposite sides, said nut comprising a pair of U-shaped disks with each said disk having a first leg, a second leg, and a base interconnecting said legs, means pivotally interconnecting said first legs of said disks so that said disks can be pivoted relative to one another between an open position and a closed position, each said disk forming a U-shaped recess with the portion of the recess formed by said base having at least one screw thread therein, wherein the improvement comprises that the first and second legs of each said disk defines the opposite sides of said U-shaped recess in said disk, said disks in the open position have said second legs disposed in laterally spaced relation and in the closed position have said second legs disposed in overlapping contacting relation with the threaded bases in said U-shaped recesses forming the threaded opening through said nut and with the second legs extending from said bases in the circumferential direction of the threaded opening, each said U-shaped disk having a first face directed toward the other said U-shaped disk and a second face directed away from the other said U-shaped disk with said first and second faces extending transversely of the axial direction of the threaded opening and defining an edge of the threaded opening, each said disk having an extension projecting from the first face thereon in the direction of the axis of the threaded opening through said nut toward the second face on the other said disk with each said extension having surfaces thereon extending in the axial direction of the threaded opening disposed in contacting engagement with similarly extending surfaces on the first and second legs on the other said disk when said disks are in closed position and in the closed position of said disks a portion of each of said U-shaped recesses combining to form the threaded opening through said nut, each of said extensions extend in the axial direction of the threaded opening at least in part from said base on said disk from which the extension projects, each said extension having a surface extending in the axial direction of the threaded opening in said nut and forming a continuation of the threaded surface of said base in said U-shaped recess and said surface on said extension forming a continuation of the threaded surface of said base and having at least one screw thread thereon forming a continuation of the at least one screw thread in the portion of said U-shaped recess formed by said base.

2. A swivel nut assembly, as set forth in claim 1, wherein locking means being formed in said disks for locking said disks together when they are in the closed position.

3. A swivel nut assembly, as set forth in claim 2, wherein said locking means being formed in said extension on one of said disks and in said second leg on the other one of said disks.

4. A swivel nut assembly, as set forth in claim 3, wherein said locking means comprises a sawtooth-shaped projection on one of said disks and a complementary sawtooth-shaped recess in the other one of said disks so that said projection fits into said recess in locking engagement.

5. A swivel nut assembly, as set forth in claim 1, wherein the surface of each said second leg defining a portion of the U-shaped recess in said disk of which it is a part being curved and concave and the axis of the radius of curvature of the curved surface being coincident with the axis of said means pivotally interconnecting said disks.

6. A swivel nut assembly, as set forth in claim 4, wherein said sawtooth-shaped projection being formed on said second leg of one of said disks and said sawtooth-shaped recess being formed on said extension on the other one of said disks.

7. A swivel nut assembly, as set forth in claim 1, wherein the dimension of each said disk and said extension formed thereon measured in the axial direction of the threaded opening through said nut being equal.

8. A swivel nut assembly, as set forth in claim 1, wherein in the closed position of said disks, the threaded surfaces of said bases and of said extensions forming a continuously threaded surface in the threaded opening between the opposite sides of said nut.

* * * * *